US009870256B2

(12) United States Patent
Hou et al.

(10) Patent No.: US 9,870,256 B2
(45) Date of Patent: *Jan. 16, 2018

(54) HARDWARE ACCELERATION WAIT TIME AWARENESS IN CENTRAL PROCESSING UNITS WITH MULTI-THREAD ARCHITECTURES

(75) Inventors: Rui Hou, Beijing (CN); Yi Ge, Beijing (CN); Kun Wang, Beijing (CN); Zhen Bo Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1352 days.

This patent is subject to a terminal disclaimer.

(21) Appl. No.: 13/572,921

(22) Filed: Aug. 13, 2012

(65) Prior Publication Data

US 2013/0031554 A1 Jan. 31, 2013

Related U.S. Application Data

(63) Continuation of application No. 13/557,211, filed on Jul. 25, 2012.

(30) Foreign Application Priority Data

Jul. 29, 2011 (CN) .......................... 2011 1 0215462

(51) Int. Cl.
*G06F 15/00* (2006.01)
*G06F 15/76* (2006.01)
(Continued)

(52) U.S. Cl.
CPC .............. *G06F 9/4843* (2013.01); *G06F 9/54* (2013.01); *G06F 2209/509* (2013.01)

(58) Field of Classification Search
None
See application file for complete search history.

(56) References Cited

U.S. PATENT DOCUMENTS 7,349,950 B2    3/2008    Stephens ...................... 709/217
7,912,832 B2    3/2011    Krieg et al. .................. 707/713
(Continued)

FOREIGN PATENT DOCUMENTS

CN       1828481 A       9/2006      ............... G06F 1/32
CN       1952877 A       4/2007      ............... G06F 9/38
(Continued)

OTHER PUBLICATIONS

Dynamics of Dynamic Site Mapping, http://www.positivearticles.com/Article/Dynamics-of-Dynamic-Site-Mapping/30310, printed May 16, 2011.
(Continued)

*Primary Examiner* — George Giroux
(74) *Attorney, Agent, or Firm* — Ido Tuchman; Jennifer R. Davis

(57) ABSTRACT

Provided is a hardware accelerator and method, central processing unit, and computing device. A hardware accelerating method includes, in response to a request for a new task issued by a hardware thread, accelerating processing of the new task and producing a processing result for the task. A predicting step predicts total waiting time of the new task for returning to a specified address associated with the hardware thread.

8 Claims, 7 Drawing Sheets

(51) Int. Cl.
*G06F 9/48* (2006.01)
*G06F 9/54* (2006.01)

(56) References Cited

U.S. PATENT DOCUMENTS

| | | | | |
|---|---|---|---|---|
| 8,015,564 | B1* | 9/2011 | Beyer | G06F 9/505 718/100 |
| 2003/0084271 | A1 | 5/2003 | Lindwer | G06F 9/318 |
| 2007/0033303 | A1* | 2/2007 | Bridges et al. | 710/23 |
| 2007/0283358 | A1* | 12/2007 | Kasahara | G06F 9/5044 718/104 |
| 2008/0140626 | A1 | 6/2008 | Wilson | 707/3 |
| 2009/0132551 | A1 | 5/2009 | Allen et al. | 707/10 |
| 2009/0198662 | A1 | 8/2009 | Prabhakar | 707/3 |
| 2009/0328046 | A1* | 12/2009 | Proctor | G06F 9/4881 718/102 |
| 2010/0299541 | A1* | 11/2010 | Ishikawa | G06F 1/3228 713/300 |
| 2011/0235099 | A1* | 9/2011 | Ito | 358/1.15 |
| 2012/0154412 | A1* | 6/2012 | Harney et al. | 345/522 |

FOREIGN PATENT DOCUMENTS

| | | | |
|---|---|---|---|
| CN | 101026783 A | 8/2007 | H04L 12/5695 |
| CN | 101262352 A | 9/2008 | H04L 29/06 |
| CN | 101262353 A | 9/2008 | H04L 12/66 |
| CN | 101309208 A | 11/2008 | G06F 17/50 |
| CN | 101441564 A | 5/2009 | G06F 9/44 |
| WO | WO 2010/114913 A1 | 10/2010 | G06F 7/00 |

OTHER PUBLICATIONS

Tom Halpin, Ajax Navigation, Dynamic Content and Search Engine Indexing, http://www.perigeeglobal.com/blog/2011/01/our-approach-to-search-engines-and-ajax-content/, printed May 16, 2011.
Gao, et al., Predictive Control and Proportional Delay Guarantee in Web Qos, China Academic Journal, vol. 37, No. 1 (Jan. 2010).

* cited by examiner

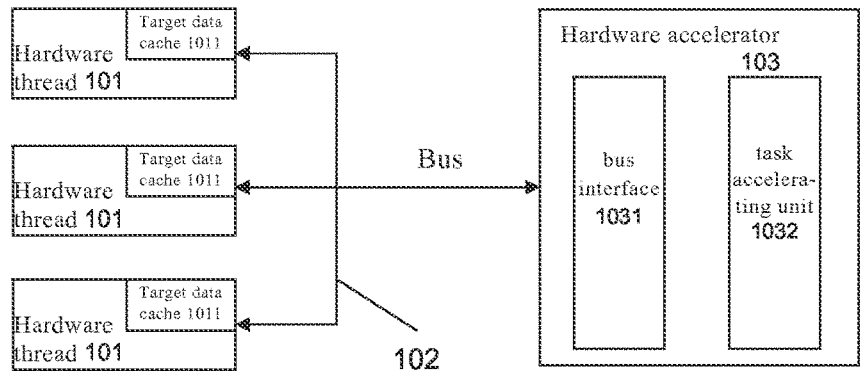
Prior Art
FIG.1
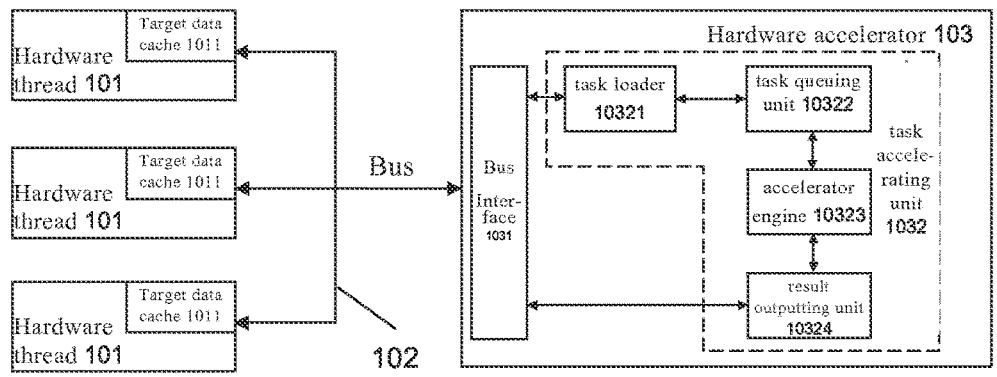
Prior Art
FIG.2
| operation code 301 | accelerator ID 302 | requesting address 303 |
Prior Art
FIG.3

| operation code 301 | accelerator ID 302 | requesting address 303 | timer address 304 |

HARDWARE ACCELERATION WAIT TIME AWARENESS IN CENTRAL PROCESSING UNITS WITH MULTI-THREAD ARCHITECTURES

CROSS-REFERENCE TO RELATED APPLICATIONS

This application claims priority under 35 U.S.C. §120 to U.S. patent application Ser. No. 13/557,211 filed Jul. 25, 2012, which claims priority under 35 U.S.C. §119 to Chinese Patent Application No. 201110215462.1 filed Jul. 29, 2011, the entire text of which is specifically incorporated by reference herein.

TECHNICAL FIELD

The present invention generally relates to computer techniques, and more specifically, to a hardware accelerator and method, central processing unit, and computing device.

BACKGROUND

In central processing units (CPU) of modern computing devices, it is common to improve processing efficiency by means of multi-thread architectures. In multi-thread architectures, accelerators which are used to offload and execute tasks from threads and return results to the threads are often adopted in order to further improve task processing speed. Since accelerators have processing speed far higher than that of the hardware of threads, processing efficiency can be further improved accordingly.

In most of multi-thread architectures, an accelerator is shared by multiple hardware threads for the fact that the number of threads is far beyond the number of accelerators.

FIG. 1 shows an architecture composed of a common hardware accelerator 103 and multiple hardware threads 101. The hardware accelerator 103 comprises a bus interface 1031 and a task accelerating unit 1032. A hardware thread 101 issues a task in the form of a request as shown in FIG. 3 to the hardware accelerator 103. After accelerating the task by the task accelerating unit 1032, its result is returned to a target data cache 1011 associated with the hardware thread.

FIG. 2 shows a particular structure of the hardware accelerator 103. A task loader 10321, in response to a new task, queues the task into a task queuing unit 10322. An accelerator engine 10323 fetches a task for processing from the task queuing unit 10322 according to its queuing order. A result outputting unit 10324 returns a processing result to the target data cache 1011 within the requiring hardware thread.

FIG. 3 is a frame format of a request issued to the hardware accelerator 103 by the hardware thread 1011. An operation code 301 is used to identify the present operation. An accelerator ID 302 is used to identify which hardware accelerator 103 is used for acceleration. A requesting address 303 is used to identify the address of the requesting hardware thread 101.

Since a thread having tasks to be executed in a hardware accelerator has no information about other tasks issued by other threads, nor the status of a task queue in the hardware accelerator, synchronous or asynchronous mechanisms are applied in hardware threads to wait for task completion.

Synchronous mechanisms generally poll on the status of the target data cache 1011 using a polling instruction continuously or detect the target data cache 1011 by a monitoring mechanism on a bus 102, and notify any updated data to the target data cache 1011 once it is detected. The hardware thread 101 does nothing during the period from sending the hardware accelerator 103 a request to obtaining a result from the target data cache 1011, thus lowering resource utilization and raising processing overhead, however, simplifying processing delay control for time-sensitive applications.

In asynchronous mechanisms, the hardware thread 101 executes other tasks during the period from sending the hardware accelerator 103 a request to obtaining a result from the target data cache 1011. The hardware thread 101 is woken up by an interrupt at a later point of time, and obtains a result from the target data cache 1011. Thus, resource utilization can be improved and processing overhead can be lowered, at a cost of complicating the processing delay control of time-sensitive applications.

Regardless of synchronous or asynchronous mechanisms, there is always some inevitable overhead needed to monitor a target data cache (the overhead refers to resources required to monitor the target data cache, and additional actions to be executed). Furthermore, hardware threads are not aware of the time for getting their results, which is disadvantageous for its task planning.

BRIEF SUMMARY

One problem solved by one aspect of the present invention is making hardware threads aware of waiting time for their processing results and thus facilitating their task planning.

According to one aspect of this invention, a hardware accelerating method includes, in response to a request for a new task issued by a hardware thread, accelerating processing of the new task and producing a processing result for the task. A predicting step predicts total waiting time of the new task for returning to a specified address associated with the hardware thread.

One advantageous effect produced by one aspect of this invention is to make hardware threads aware of the time for getting their processing results, thus facilitating their task planning.

BRIEF DESCRIPTION OF THE DRAWINGS

The drawings referenced in the present application are only used to exemplify typical embodiments of the present invention and should not be considered to be limiting the scope of the present invention.

FIG. 1 shows the working principle of a hardware accelerator in prior art;

FIG. 2 shows a particular structure of a task accelerating unit shown in FIG. 1;

FIG. 3 is a format of a request frame sent to a hardware accelerator from a hardware accelerator in prior art;

DETAILED DESCRIPTION

In the following discussion, details are provided to help thoroughly understand the present invention. However, it should be appreciated that any specific terms used below are only for the convenience of description, and thus the present invention should not be limited to only use in any specific applications represented and/or implied by such terms.

Figure 4:
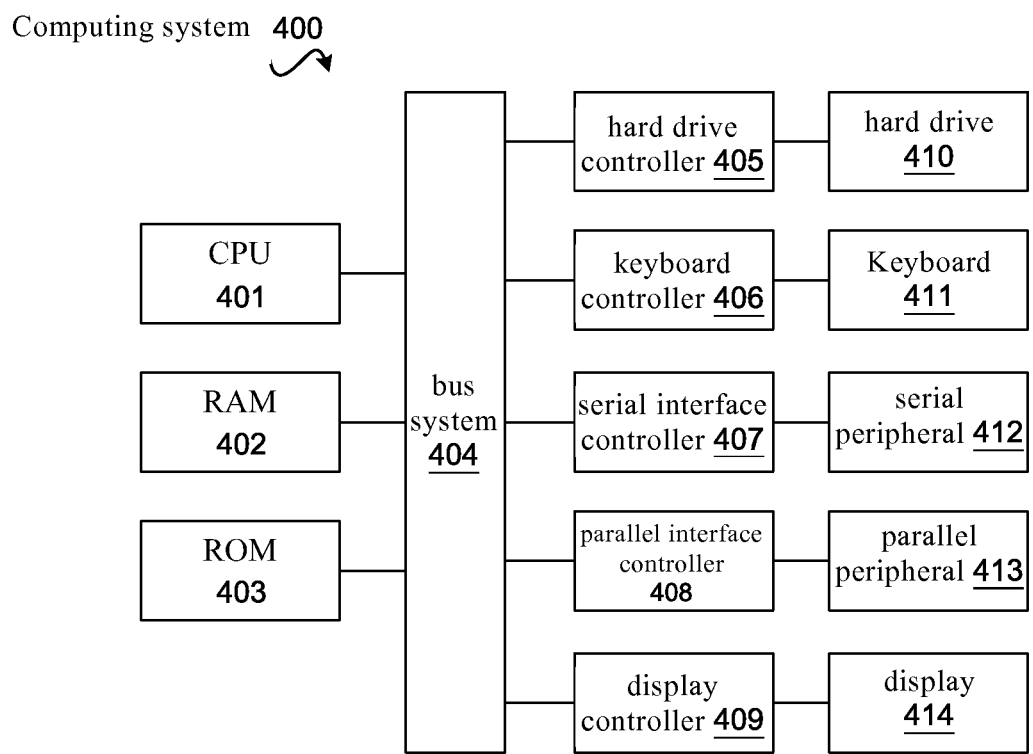
FIG. 4 shows a block diagram of an exemplary computing system suitable to implement an embodiment of the present invention.

FIG. 4 shows a block diagram of an example computer system 400 which is applicable to implement the embodiments of the present invention. As shown in FIG. 4, the computer system 400 may include: CPU (Central Processing Unit) 401, RAM (Random Access Memory) 402, ROM (Read Only Memory) 403, System Bus 404, Hard Drive Controller 405, Keyboard Controller 406, Serial Interface Controller 407, Parallel Interface Controller 408, Display Controller 409, Hard Drive 410, Keyboard 411, Serial Peripheral Equipment 412, Parallel Peripheral Equipment 413 and Display 414. Among above devices, CPU 401, RAM 402, ROM 403, Hard Drive Controller 405, Keyboard Controller 406, Serial Interface Controller 407, Parallel Interface Controller 408 and Display Controller 409 coupled to the System Bus 404. Hard Drive 410 is coupled to Hard Drive Controller 405. Keyboard 411 is coupled to Keyboard Controller 406. Serial Peripheral Equipment 412 is coupled to Serial Interface Controller 407. Parallel Peripheral Equipment 413 is coupled to Parallel Interface Controller 408. Display 414 is coupled to Display Controller 409. It should be understood that the structure as shown in FIG. 4 is only for an exemplary purpose rather than any limitation to the present invention. In some cases, some devices may be added to or removed based on specific situations.

Figure 5:
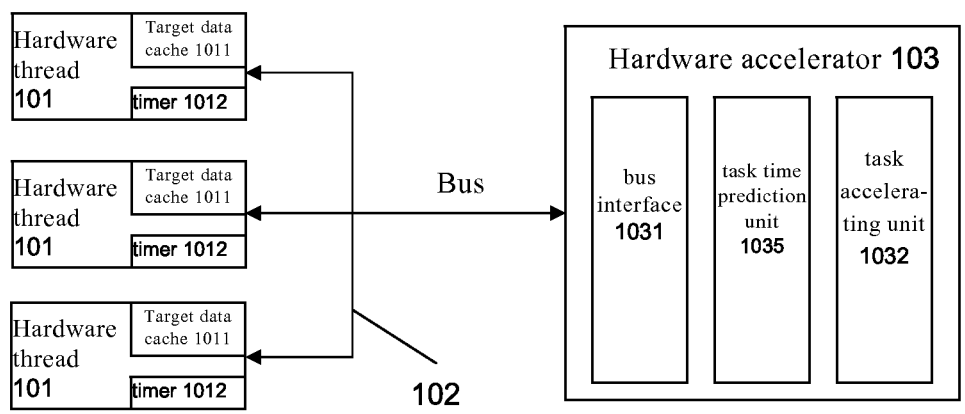
FIG. 5 is a schematic diagram showing the working principle of a hardware accelerator according to one embodiment of this disclosure.
Figures 6, 7:
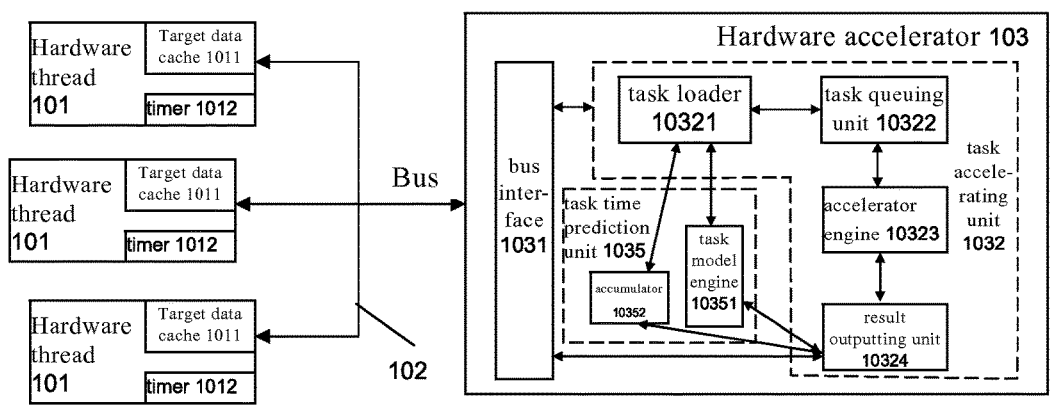
FIG. 6 shows one specific implementation of a task time prediction unit shown in FIG. 4.
FIG. 7 is a format of a request frame sent to a hardware accelerator from a hardware accelerator according to one embodiment of this disclosure.

The hardware accelerator 103 and hardware thread 101 shown in FIG. 5 are included in the CPU shown in FIG. 4. As shown in FIG. 5, as compared to FIG. 1, there is a task time prediction unit 1035 added in the hardware accelerator 103 of one embodiment of this disclosure. The hardware thread 101 sends a request to the hardware accelerator 103 through a bus 102 in a frame format as shown in FIG. 7. The difference between FIG. 7 and FIG. 3 lies in an additional timer address field 304, which is used to specify the address of a timer to which the predicted time will be returned. The task time prediction unit 1035 predicts the total waiting time of a new task in response to the reception of the task. The total waiting time of the new task means a necessary period of time from receiving a new task by a hardware accelerator to the execution completion of the task, which is equal to the sum of the time required for the execution of the new task itself and the time required by the hardware accelerator to complete those tasks that have not been completed therein when the new task is received. For example, when a hardware accelerator receives a task E, there are still other tasks A, B, C, D existing in the hardware accelerator that have not been completed. The task E needs two minutes to complete its execution, and tasks A, B, C, D need ten minutes to complete their execution. Thus, the total waiting time of new task E is 12 mins=10 mins+2 mins. With respect to hardware thread strategies, a new task's total waiting time is most significant and task execution time per se is not critical. Therefore, the total waiting time of a new task is sent back to a hardware thread in one embodiment of this invention.

Upon predicting a total waiting time for the new task, the task time prediction unit 1035 returns the time to a specified address associated with the hardware thread. In one implementation, the specified address is the address of a timer within the hardware thread which is specified in the request frame. The timer is a register of the hardware thread. Through checking the register, the hardware thread can recognize how long to be waited before getting a processing result, thus facilitating its task planning.

The task accelerating unit 1032, similarly to the task accelerating unit 1032 as shown in FIG. 1, is configured to, in response to a request for a new task issued by a hardware thread, accelerate the processing of the new task and produce a processing result for the task.

Alternatively, it is still applicable to adopt the request frame format shown in FIG. 3 rather than that shown in FIG. 7. At this point, the specified address associated with the hardware thread is a predetermined inner address within the hardware thread, and the predicted total waiting time of the new task is returned to the predetermined address, avoiding the burden of specifying a particular address in the request, which is generally practicable in such situations as business internal networks, where a unique convention about a return address is available.

Alternatively, the specified address associated with the hardware thread also can be without the hardware thread. For instance, it can be a memory outside of the hardware thread. Certainly, it can be a predetermined memory, and also can be specified and transmitted to the hardware accelerator from the hardware thread in a request frame format similar to that as shown in FIG. 7, for example, and have a result returned thereto from the hardware accelerator. Needless to say, the specified address associated with the hardware thread is not limited to the above manners. Many changes can be made by those skilled in the art benefited from the above teachings without departing from the principle of this invention.

FIG. 6 shows one implementation of the task time prediction unit 1035, wherein the task time prediction unit comprises a task model engine 10351 and an accumulator 10352.

When a new task request comes into a task loader 10321 through a bus interface 1031, relative information about the new task is sent to the task model engine 10351 by the task loader 10321. The task model engine 10351 evaluates the task execution time for the new task based on a task model, and then returns the evaluated task execution time to the task loader 10321. The task loader 10321 sends the task execution time to the accumulator 10352, which stores therein the time required to complete all tasks that have not yet been completed at present in the task accelerating unit. The accumulator 10352 accumulates the task execution time to the accumulation result it stored for notifying the newly accumulated result to the hardware thread as the total waiting time of the new task. The accumulator 10352 returns the total waiting time of the new task to the task loader 10321, which in turn returns it to the specified address associated with the hardware thread via a bus interface. The total waiting time of the new task can be returned to the specified address associated with the hardware thread without waiting for the handling of the new task. Therefore, the hardware thread can get the total waiting time of the new task soon after sending a request to the task accumulation unit, facilitating the preceding planning of next activities to be carried out.

In the case that there are no any tasks in the hardware accelerator, the accumulation result in the accumulator 10352 is initialized to be zero and then varies with the above process continuously.

On the other hand, a task can be put into a queue in a task queuing unit 10322 and is carried out in an accelerator engine 10323. Optionally, task information is transmitted to a task model engine 10351 along with the actual execution time by a result outputting unit 10324, and consequently, the task model engine 10351 can adjust the task model according to such information, with a benefit of continuously correcting the task model depending on practical situations for an improved accuracy of a next prediction. Needless to say, the prediction effect also can be achieved without returning the actual execution time to the task model engine.

The task model engine 10351 in turn transmits the predicted execution time of a corresponding task to the result outputting unit 10324, which then sends it to the accumulator 10352. Alternatively, the task model engine 10351 may directly transmit the predicted execution time of a corresponding task to the accumulator 10352, which then subtracts the predicted execution time from the present accumulation result.

With respect to task models of the task model engine, there are many known techniques. In one implementation, the task model engine can evaluate the task execution time based on one or more of the following items: processing frequency, input data size, and average cache hit ratio. Other task models are also possible. The processing frequency is almost constant in a processing core. The input data size is determined by a task itself, and therefore is fixed and can be easily calculated. The average cache hit ratio is a statistical value representing the cache status in a time, which can be adjusted after task execution depending on the actual execution time fed back by the result outputting unit 10324.

Figure 8:
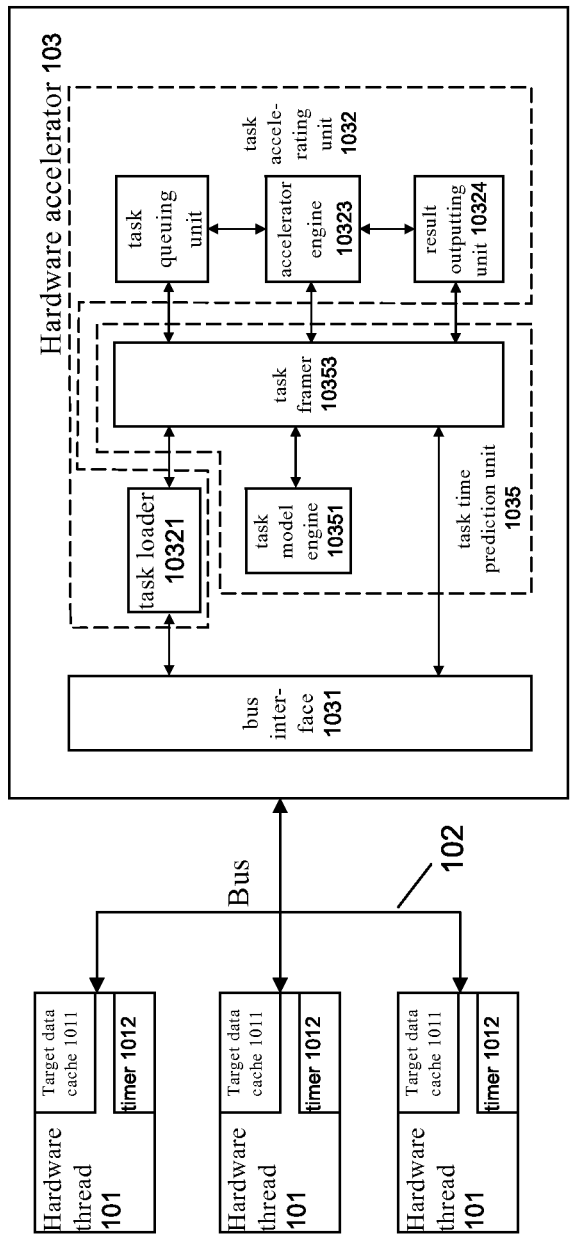
FIG. 8 shows another specific implementation of the task time prediction unit shown in FIG. 4.

FIG. 8 shows another implementation of the task time prediction unit 1035, wherein the task time prediction unit 1035 comprises a task model engine 10351 and a task framer 10353.

Figure 9:
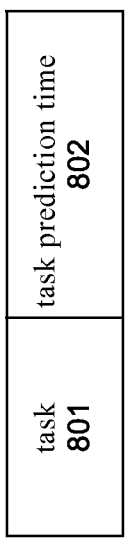
FIG. 9 shows a format of a queued task frame according to one embodiment of this disclosure.

The task framer 10353 transmits relative information of a new task received by the task loader 10321 to the task model engine 10351 before putting the task in the task queuing unit 10322. The task model engine 10351 evaluates the task execution time 802 for the new task based on a task model, which is then appended to the task as a new field by the task framer 10353, as shown in FIG. 9. The task framer 10353 stores therein the time required to complete all ongoing tasks that have not yet been completed presently in the task accelerating unit as an accumulation result. The task framer 10353 adds the task execution time evaluated by the task model engine to the accumulation result stored in the task framer, and then notifies the newly accumulated result to the hardware thread as the total waiting time of the new task. The task framer 10353 transmits the total waiting time of the new task to the task loader 10321, which in turn returns it to a specified address associated with the hardware thread.

In the case that there are no any tasks in the hardware accelerator, the accumulation result in the task framer 10353 is initialized to be zero and then varies with the above process continuously.

Optionally, once an acceleration task is completed, its task information can be transmitted to the task framer 10353 along with its actual execution time by the result outputting unit 10324, which is then sent to a task model engine 10351 by the task framer 10353. The task model engine 10351 can adjust the task model according to the actual execution time.

The task framer 10353 subtracts the task execution time within the execution time field of a corresponding task from the accumulation result stored therein.

Other part of the implementation shown in FIG. 8 is similar to that of FIG. 6.

In the implementation of FIG. 6, upon evaluated by the task model engine, the task execution time of the new task is directly returned to the hardware thread. After the accumulated execution of the task, the result outputting unit 10324 does not know the task execution time and thus cannot send it back to the accelerator 10352 for its subtracting operation. A task execution time field is provided for the task in the implementation of FIG. 8. The result outputting unit 10324 can be aware of the task execution time with reference of that field without enquiring the task model engine 10351.

Figure 10:
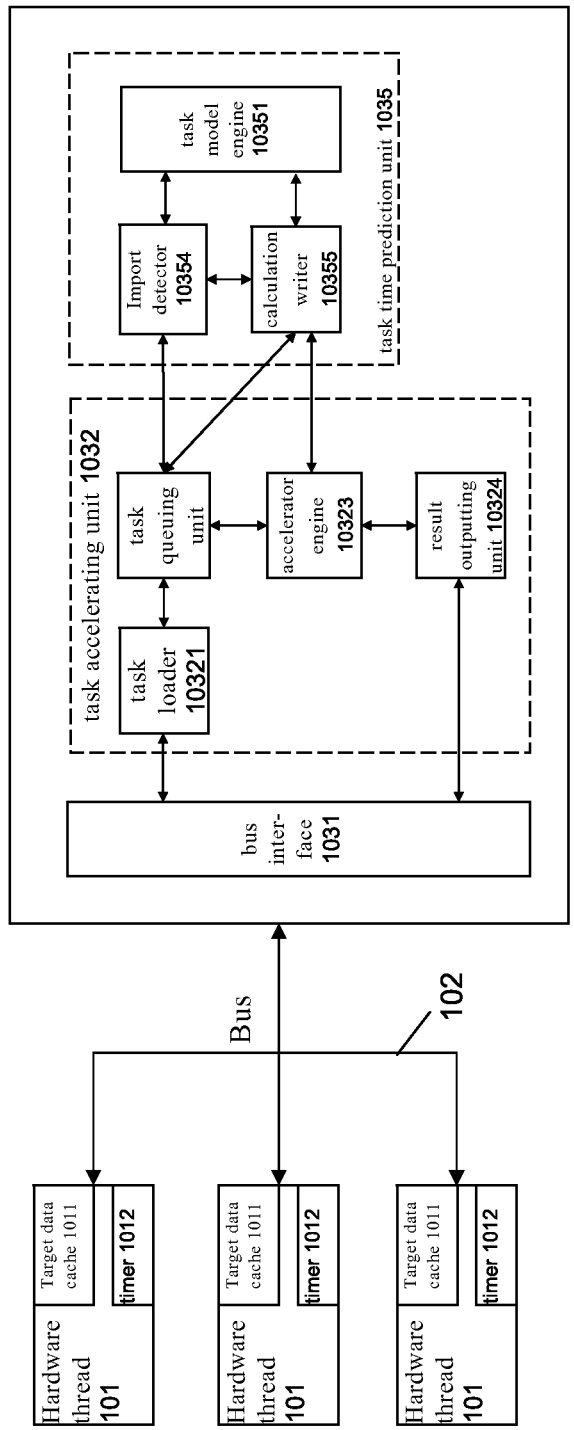
FIG. 10 shows another specific implementation of the task time prediction unit shown in FIG. 4.

FIG. 10 shows another implementation of the task time prediction unit 1035, wherein the task time prediction unit 1035 comprises a task model engine 10351, an import detector 10354 and a calculation writer 10355.

The import detector 10354 detects a new task imported into a queue in the task accelerating unit. The task model engine 10351 evaluates the task execution time for the new task based on a task model in response to the new task detected by the import detector 10354. When the import detector 10354 detects a new task, the calculation writer 10355 appends a field of task execution time for the queued new task based on the task execution time evaluated by the task model engine 10351. The calculation writer 10355 stores therein the time required to complete all tasks that have not yet been completed in the task accelerating unit, and accumulates the task execution time evaluated by the task model engine to the accumulation result stored therein for notifying the newly accumulated result to the hardware thread as total waiting time of the new task. The total waiting time of the new task is returned to a specified address associated with the hardware thread through a task queuing unit 10322, task loader 10321, and bus interface 1031.

In the case that there are no any tasks in the hardware accelerator, the accumulation result in the calculation writer 10355 is initialized to be zero and then varies with the above process continuously.

Optionally, once an accelerating task is completed, its related information can be notified to the calculation writer 10355 along with an actual execution time by an accelerator engine 10323, the actual execution time is then notified to the task model engine 10351 by the calculation writer 10355. The task model engine 10351 can adjust the task model according to the actual execution time.

The calculation writer 10355 subtracts the task execution time within the field of task execution time of the corresponding task from the accumulation result stored therein.

Other parts of the implementation shown in FIG. 10 are similar to those of FIG. 6. The difference between implementations of FIG. 10 and FIG. 8 is that the import detector 10354, task model engine 10351 and calculation writer 10355 are all arranged as back ends of the task accelerating unit 1032, avoiding influence on normal operations of the task accelerating unit 1032.

According to one embodiment, a CPU is provided, which comprises: the above-mentioned hardware accelerator; and a hardware thread, which requests, for a specific task, the hardware accelerator to accelerate the processing of the specific task.

According to one embodiment, a computing device comprising the above-mentioned CPU is provided.

Figure 11:
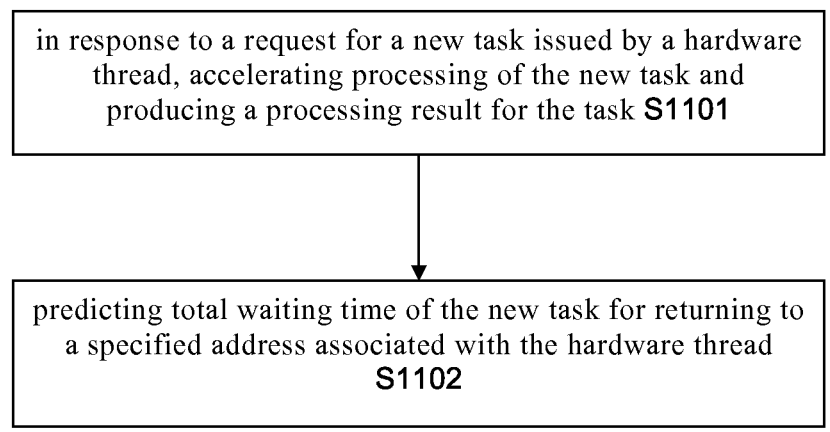
FIG. 11 is a flow chart of a method according to one embodiment of this disclosure.

According to one embodiment as shown in FIG. 11, a hardware accelerating method comprises: in response to a request for a new task issued by a hardware thread, accelerating the processing of the new task and producing a processing result for the task, as shown in step S1101; predicting the total waiting time of the new task for returning to a specified address associated with the hardware thread, as shown in step S1102.

In one embodiment, the step S1102 of predicting the total waiting time of the new task for returning to a specified address associated with the hardware thread comprises: in response to the reception of the new task, evaluating the task execution time for the new task based on a task model; storing the time required to complete all tasks that have not yet been completed as an accumulation result, accumulating the evaluated task execution time to the stored accumulation result for notifying the hardware thread of the newly accumulated result as the total waiting time of the new task, and subtracting the corresponding task execution time from the stored accumulation result after completing the task.

In one embodiment, the step S1102 of predicting the total waiting time of the new task for returning to a specified address associated with the hardware thread comprises: evaluating task execution time for the new task based on a task model; storing the time required to complete all tasks that have not yet been completed as an accumulation result, in response to the reception of the new task, appending a field of evaluated task execution time for the new task to the new task before queuing it into a queue, accumulating the task execution time within the field of task execution time to the stored accumulation result so as to notify the hardware thread of the newly accumulated result as the total waiting time of the new task, and then subtracting the task execution time within the corresponding task execution time field from the stored accumulation result after completing the task.

In one embodiment, the step S1102 of predicting the total waiting time of the new task for returning to a specified address associated with the hardware thread comprises: detecting the new task imported into a queue; in response to the detection of the new task imported into the queue, evaluating task execution time for the new task based on a task model; storing the time required to complete all tasks that have not yet been completed as an accumulation result, and based on the evaluated task execution time, appending a field of task execution time to the new task, accumulating the task execution time within the task execution time field to the stored accumulation result so as to notify the hardware thread of the newly accumulated result as the total time to be wait by the new task, and then subtracting the task execution time within the corresponding task execution time field from the stored accumulation result after completing the task.

In one embodiment, the request issued by the hardware thread comprises the address of an inner register of the hardware thread for specifying the specified address associated with the hardware thread to which the total waiting time of the new task will be returned.

In one embodiment, the task execution time is evaluated for the new task based on one or more of the following items: processing frequency, input data size, and average cache hit ratio.

In one embodiment, the actual execution time of the new task is used to adjust the task model after the completion of the new task.

Furthermore, one aspect of this disclosure also can lower the overhead of monitoring a target data cache.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms a, an and the are intended to include the plural forms as well, unless the context clearly indicates otherwise. It will be further understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable those of ordinary skill in the art to understand the invention for various embodiments with various modifications as are suited to the particular use contemplated.

What is claimed is:

1. A hardware accelerating method, comprising:
    in response to a request for a new task issued by a hardware thread, accelerating processing of the new task by a hardware accelerator and producing a processing result for the task; and
    predicting total waiting time of the new task for returning to a specified address associated with the hardware thread based upon a sum of time required by the hardware accelerator to complete execution of the new task itself and time required by the hardware accelerator to complete those tasks that have not been completed therein when the new task is received; and
    wherein the request issued by the hardware thread comprises an address of an inner register of the hardware thread to specify the specified address associated with the hardware thread to which the total waiting time of the new task will be returned.

2. The hardware accelerating method of claim 1, wherein the step of predicting total waiting time of the new task for returning to a specified address associated with the hardware thread comprises:
    in response to reception of the new task, evaluating task execution time for the new task based on a task model; and
    storing time required to complete all tasks that have not yet been completed as an accumulation result, accumulating the evaluated task execution time to the stored accumulation result for notifying the hardware thread of the newly accumulated result as the total waiting time of the new task, and subtracting the corresponding execution time from the stored accumulation result after the completion of a task.

3. The hardware accelerating method of claim 1, wherein the step of predicting total waiting time of the new task for returning to a specified address associated with the hardware thread comprises:
    evaluating task execution time for the new task based on a task model; and
    storing the time required to complete all tasks that have not yet been completed as an accumulation result, in response to reception of the new task, appending a field of evaluated task execution time for the new task before putting it into a queue, accumulating the task execution time within the task execution time field to the stored accumulation result so as to notify the hardware thread of the newly accumulated result as the total waiting time of the new task, and subtracting a task execution time within a corresponding task execution time field from the stored accumulation result stored after the completion of a task.

4. The hardware accelerating method of claim 1, wherein the step of predicting a total waiting time of the new task for returning to a specified address associated with the hardware thread comprises:
    detecting the new task imported into a queue;
    in response to the detection of the new task imported into the queue, evaluating task execution time for the new task based on a task model; and
    storing time required to complete all tasks that have not yet been completed as an accumulation result, based on the evaluated task execution time, appending a field of task execution time for the new task to the new task, accumulating the task execution time within the task execution time field to the stored accumulation result so as to notify the hardware thread of the newly accumulated result as the total waiting time of the new task, and subtracting the task execution time within a corresponding task execution time field from the stored accumulation result after the completion of a task.

5. The hardware accelerating method of claim 1, wherein the task execution time is evaluated for the new task based on one or more of the following items: processing frequency, input data size, and average cache hit ratio.

6. The hardware accelerating method of claim 1, wherein the actual execution time of the new task is used to adjust the task model after the completion of the new task.

7. The hardware accelerating method of claim 1, further comprising storing the total waiting time of the new task at a register of the hardware thread.

8. The hardware accelerating method of claim 1, wherein accelerating processing of the new task and producing the processing result for the task includes offloading and executing the new task to the hardware accelerator, the hardware accelerator shared by multiple hardware threads, the hardware accelerator including a processing speed higher than that of the hardware threads.

\* \* \* \* \*